(12) United States Patent
Nieminen

(10) Patent No.: US 8,462,733 B2
(45) Date of Patent: Jun. 11, 2013

(54) METHOD AND SYSTEM FOR TRANSFERRING A COMMUNICATION SESSION BETWEEN DATA SOURCES

(75) Inventor: Juha-Petteri Nieminen, Espoo (FI)

(73) Assignee: Tellabs Oy, Espoo (FI)

( * ) Notice: Subject to any disclaimer, the term of this patent is extended or adjusted under 35 U.S.C. 154(b) by 344 days.

(21) Appl. No.: 12/862,805

(22) Filed: Aug. 25, 2010

(65) Prior Publication Data

US 2011/0064047 A1 Mar. 17, 2011

(30) Foreign Application Priority Data

Sep. 17, 2009 (FI) ..................................... 20095956

(51) Int. Cl.
*H04W 4/00* (2009.01)

(52) U.S. Cl.
USPC ......................................................... 370/331

(58) Field of Classification Search
USPC ............................ 370/328–339; 455/436–444
See application file for complete search history.

(56) References Cited

U.S. PATENT DOCUMENTS

| 6,904,025 | B1 * | 6/2005 | Madour et al. ................. 370/328 |
| 7,305,474 | B2 * | 12/2007 | Giaffreda et al. ............. 709/227 |
| 8,134,972 | B2 * | 3/2012 | Nakamura et al. ............ 370/331 |
| 2003/0212764 | A1 | 11/2003 | Trossen et al. |
| 2007/0160049 | A1 | 7/2007 | Xie et al. |
| 2008/0153460 | A1 | 6/2008 | Chan et al. |

FOREIGN PATENT DOCUMENTS

| EP | 1821488 A1 | 8/2007 |
| EP | 2 073 483 A1 | 6/2009 |
| WO | 03084171 A1 | 10/2003 |

OTHER PUBLICATIONS

Finnish Search Report, dated May 12, 2010, from corresponding Finnish application.
European Search Report, dated Dec. 7, 2010, EP 10176312.

* cited by examiner

*Primary Examiner* — Frank Duong
(74) *Attorney, Agent, or Firm* — Young & Thompson

(57) ABSTRACT

To transfer a communication session from a first data source to a second data source, the following operations are carried out when a radio terminal is handed over from a first base station to a second base station: the session settings and status information related to the communication session are transferred (503) to be used in conjunction with the second data source, a first portion of the payload data related to the communication session is sent (504) in accordance with the session settings from the first data source to the radio terminal via the second base station, and the next portion of the payload data which according to the status information still has to be sent to the radio terminal during the communication session is sent (506) in accordance with the session settings from the second data source to the radio terminal via the second base station. The transfer of the communication session is not visible to the radio terminal because the transmission of payload data continues uninterrupted and the session settings, such as TCP socket parameters, remain unchanged during the transfer.

27 Claims, 4 Drawing Sheets

METHOD AND SYSTEM FOR TRANSFERRING A COMMUNICATION SESSION BETWEEN DATA SOURCES

FIELD OF INVENTION

The invention relates to a method and a system for transferring a communication session from a first data source to a second data source. The invention also relates to a device connectable to said first data source for controlling the transfer of a communication session. The invention also relates to a device connectable to said second data source for controlling the transfer of a communication session. The invention also relates to a computer program for controlling the transfer of a communication session in the device connected to said first data source. The invention also relates to a computer program for controlling the transfer of a communication session in the device connected to said second data source.

BACKGROUND OF INVENTION

FIG. 1 shows a prior-art communication system 100 which is part of a larger communications network and is used for establishing data transfer connections to base stations 101, 102, and 103 of a mobile telephone network. The communication system includes data communication devices 104, 105, and 106 which may be e.g. Internet Protocol (IP) routers, Multiprotocol Label Switching (MPLS) devices and/or Ethernet switches. Each data communication device may consist of a single apparatus or a combination of a plurality of interconnected apparatuses. The data communication devices are interconnected through a regional communications network 107. The regional communications network 107 may include other data communication devices and communication links between them. The communication system includes a gateway device 108 providing a data transfer connection to a communication backbone network 109, represented e.g. by the global Internet. The communication system includes a mobility management entity (MME) 110 arranged to maintain up-to-date information about the location of a radio terminal 111 in the radio communication network comprised of base stations 101 to 103. The mobility management entity 110 is connected to the gateway device 108 either directly or through a communications network. The mobility management entity 110 may also be embedded in the gateway device 108. The radio terminal 111 can be a mobile phone or palmtop computer, for example.

The mobility management entity 110 is arranged to produce, based on the location of the radio terminal 111, control data on the basis of which the data communication device 104 is able to establish a logical data transmission tunnel 112 between the data communication device 104 and base station 101 in response to a situation in which the radio terminal is under the base station 101. Similarly, data communication device 105 is able to establish a logical data transmission tunnel 113 between the data communication device 105 and base station 102 in response to a situation in which the radio terminal is under the base station 102, and data communication device 106 is able to establish a logical data transmission tunnel 114 between the data communication device 106 and base station 103 in response to a situation in which the radio terminal is under the base station 103. The producing of said control data is often called a communications network mobility function. Said logical data transmission tunnels may be e.g. GTP-U (General Packet Radio Service Tunneling Protocol—User plane messages) tunnels, GRE (Generic Routing Encapsulation) tunnels, IPinIP (Internet Protocol in Internet Protocol) tunnels or data transmission tunnels implemented using Ethernet frames.

In the situation depicted in FIG. 1 we may assume, for instance, that the radio terminal 111 is first under base station 101 and there exists an ongoing communication session between the radio terminal and a communications network, which session can comprise e.g. the downloading of a web page from a data source in the communications network to the radio terminal in accordance with the Transmission Control Protocol (TCP). Said communication session may be originally established between the radio terminal 111 and a data source 115 behind the communication system 100. The data source 115 can be a server for maintaining certain web pages, for example. In said communication session, the payload data transmitted to the radio terminal, e.g. a web page, may also be stored in data sources 116 and 117 in connection with the data communication devices 104 and 105 each of which may include a cache memory device, for example. In such a situation, the payload data is transmitted to the radio terminal 111 advantageously from data source 116 instead of data source 115 to produce a load as small as possible upon the communications network. It is of course possible that data source 116 is a server and said communication session is originally established between the radio terminal 111 and the data source 116. In a situation in which the radio terminal 111 is handed over from base station 101 to base station 102 the logical data transmission tunnel 112 is removed and a logical data transmission tunnel 113 is established based on the control data produced by the mobility management entity 110. The communication session is either transferred from data source 116 to data source 117 or said communication session is disconnected and a new one is established between the radio terminal 111 and data source 117. To transfer the communication session between data sources 116 and 117 or to continue the communication session with a new communication session there is typically needed in the radio terminal 111 a dedicated client agent which can be software-based, for example. Document US20060268780, for instance, discloses a technical solution according to the prior art where a client agent is required in the radio terminal for controlling a communication session as said radio terminal is handed over from one base station to another.

SUMMARY OF INVENTION

The invention is directed to a novel system for transferring a communication session from a first data source to a second data source. The system according to the invention comprises:
    a first device having a communication interface for connecting to said first data source, which device is arranged to maintain a communication session between a radio terminal and said first data source via a first base station in a communications network in response to a situation in which said radio terminal is under said first base station, and
    a second device having a communication interface for connecting to said second data source,
said first device being also arranged to carry out the following operations in response to a situation in which said radio terminal has been handed over during said communication session from said first base station to a second base station in the communications network:
    sending of session data related to said communication session to said second device, where said session data are arranged to indicate the session settings used in said communication session and the status of the communication session when said radio terminal is handed over from said first base station to said second base station, and sending of a first portion of payload data related to said communication session and stored in said first data source to said second device, and said second device being arranged to carry out the following operations in response to said situation in which said radio terminal has been handed over during said communication session from said first base station to said second base station:

forwarding of said first portion of payload data in accordance with said session settings to said radio terminal via said second base station, and sending of a second portion of said payload data, which according to said session data still has to be sent to said radio terminal during the communication session, from said second data source in accordance with said session settings via said second base station to said radio terminal in response to a situation in which said second data source contains said second portion of the payload data.

The transfer of the communication session is not visible to said radio terminal because the transmission of payload data continues uninterrupted and the session settings, represented by TCP socket parameters, for example, remain unchanged during the transfer of the communication session. No client agent is therefore needed in the radio terminal to control the communication session as the radio terminal is handed over from one base station to another. The transmission of payload data continues uninterrupted because the first portion of said payload data is transmitted from said first device to said second device which is arranged to forward the first portion of the payload data to said radio terminal. The second device is thus able to start the transmission of payload data without delay and from the correct position. While forwarding payload data received from said first device the second device has a chance to carry out the necessary initialization procedures to start transmitting the remaining portion of the payload data from the second data source. Said first data source can be a cache memory device arranged to emulate a server, or it can be a server, for example. Similarly, said second data source can be a cache memory device arranged to emulate a server, or it can be a server, for example. For example, it is possible that said first data source is a server and said second data source is a cache memory device arranged to emulate said first data source.

The invention is also directed to a novel device, connectable to a data source which hands over a communication session, for controlling the transfer of the communication session, comprising:

a communication interface for connecting to said data source, and a processor system arranged to maintain a communication session between a radio terminal and said data source via a first base station in a communications network in response to a situation in which said radio terminal is under said first base station, said processor system being also arranged to carry out the following operations in response to a situation in which said radio terminal is being handed over during said communication session from said first base station to a second base station in the communications network:

sending of session data related to said communication session to another device arranged to provide a data transfer connection with said second base station, where said session data are arranged to indicate the session settings used in said communication session and the status of the communication session when said radio terminal is being handed over from said first base station to said second base station, and sending of payload data related to said communication session and stored in said data source to said other device.

The invention is also directed to a novel device for controlling the transfer of a communication session, the device being connectable to a data source which receives the communication session and comprising a communication interface for connecting to said data source and a processor system arranged to carry out the following operations in response to a situation in which a radio terminal participating in said communication session has been handed over from a first base station in a communications network to a second base station in said communications network:

receiving of session data related to said communication session from another device arranged to provide a data transfer connection with said first base station, where said session data are arranged to indicate the session settings used in said communication session and the status of the communication session when said radio terminal is handed over to said second base station from said first base station, forwarding of a first portion of payload data related to said communication session, received from said other device, to said radio terminal via said second base station in accordance with said session settings, and sending of a second portion of said payload data, which according to said session data still has to be sent to said radio terminal during the communication session, from said data source in accordance with said session settings to said radio terminal via said second base station in response to a situation in which said data source contains said second portion of the payload data.

The invention is also directed to a novel method for transferring a communication session from a first data source over to a second data source. In the method according to the invention:

a communication session between a radio terminal and the first data source is maintained through a first base station in a communications network in response to a situation in which said radio terminal is under said first base station, and the following operations a, b, and c are carried out in response to a situation in which said radio terminal has been handed over during said communication session from said first base station to a second base station in the communications network:

(a) session data related to said communication session are transferred to be used in conjunction with the second data source, where said session data indicate the session settings used in said communication session and the status of the communication session when said radio terminal is handed over from said first base station to said second base station, (b) a first portion of payload data related to said communication session is sent from said first data source in accordance with said session settings to said radio terminal via said second base station, and (c) in response to a situation in which said second data source contains the second portion of the payload data, which according to said session data still has to be sent to said radio terminal during the communication session, the second portion of the payload data is sent in accordance with said session settings from said second data source via said second base station to said radio terminal.

The invention is also directed to a novel computer program for controlling the transfer of a communication session, to be used in a device connected to a data source handing over the communication session, which computer program comprises instructions executable by a programmable processor device for making the programmable processor device carry out the following operations in response to a situation in which a radio terminal participating in said communication session is being handed over during said communication session from a first base station in a communications network to a second base station in said communications network:

sending of session data related to said communication session to another device arranged to provide a data transfer connection with said second base station, where said session data are arranged to indicate the session settings used in said communication session and the status of the communication session when said radio terminal is being handed over from said first base station to said second base station, and sending of payload data related to said communication session and stored in said data source to said other device.

The invention is also directed to a novel computer program for controlling the transfer of a communication session, to be used in a device connected to a data source receiving the communication session, which computer program comprises instructions executable by a programmable processor device for making the programmable processor device carry out the following operations in response to a situation in which a radio terminal participating in said communication session is handed over during said communication session from a first base station in a communications network to a second base station in said communications network:

receiving of session data related to said communication session from another device arranged to provide a data transfer connection with said first base station, where said session data are arranged to indicate the session settings used in said communication session and the status of the communication session when said radio terminal is handed over to said second base station from said first base station, forwarding of a first portion of payload data related to said communication session, received from said other device, to said radio terminal via said second base station in accordance with said session settings, and sending of a second portion of said payload data, which according to said session data still has to be sent to said radio terminal during the communication session, from said data source in accordance with said session settings via said second base station to said radio terminal in response to a situation in which said data source contains said second portion of the payload data.

The invention is also directed to a computer software product comprising a computer-readable data storage medium, such as a compact disc, with a computer program according to the invention stored thereon.

The invention is also directed to a computer-readable signal arranged to contain a computer program according to the invention.

The various embodiments of the invention are characterized by that which is specified in the dependent claims.

BRIEF DESCRIPTION OF DRAWINGS

Embodiments and advantages of the invention will now be described in closer detail with reference to the embodiments presented as examples and to the accompanying drawings where

FIG. 1 was explained earlier in this document in connection with the description of the prior art.

DESCRIPTION OF EMBODIMENTS OF INVENTION

Figure 1:
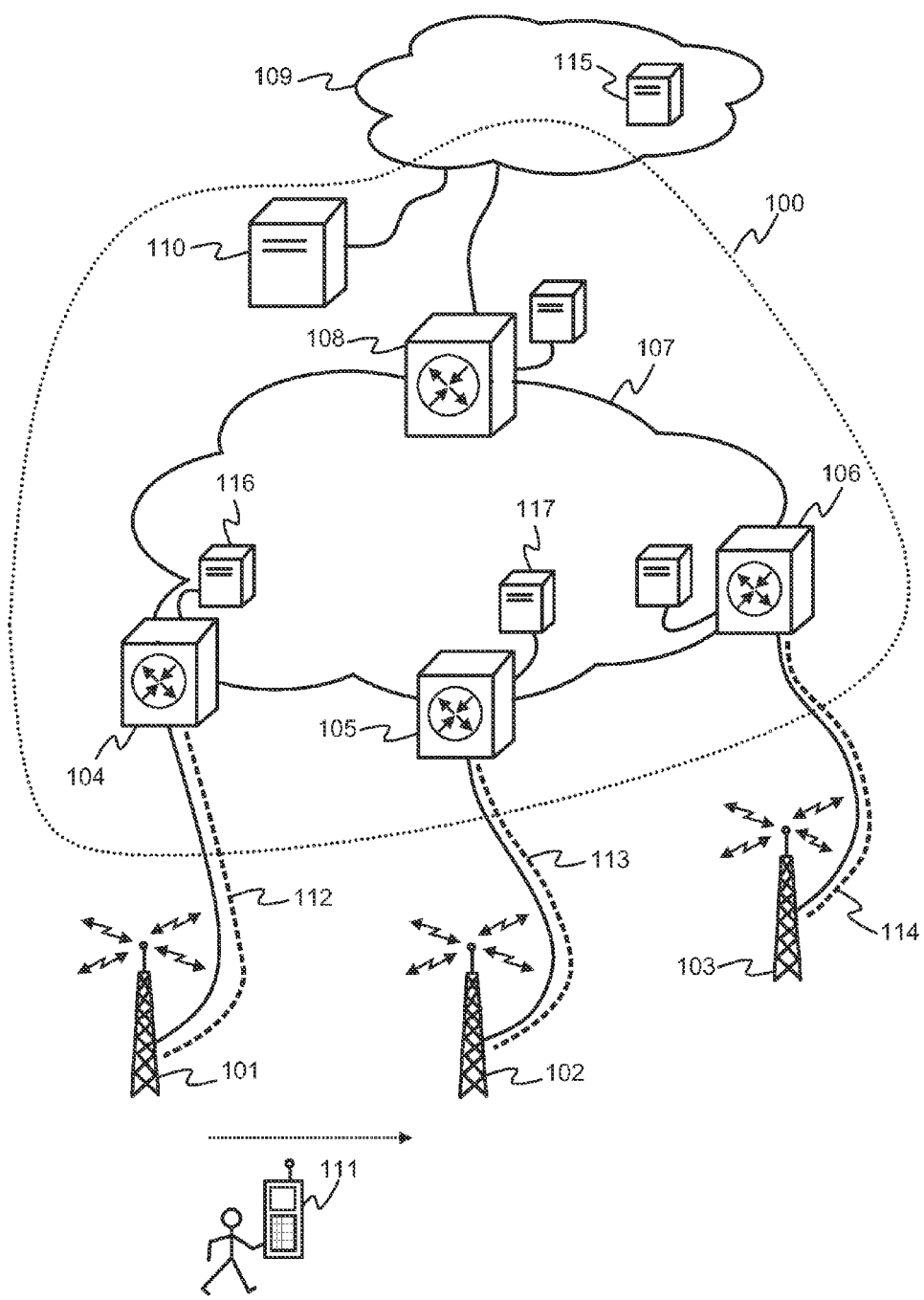
FIG. 1 shows a communication system including a prior-art system for transferring a communication session from a data source to another data source.
Figure 2:
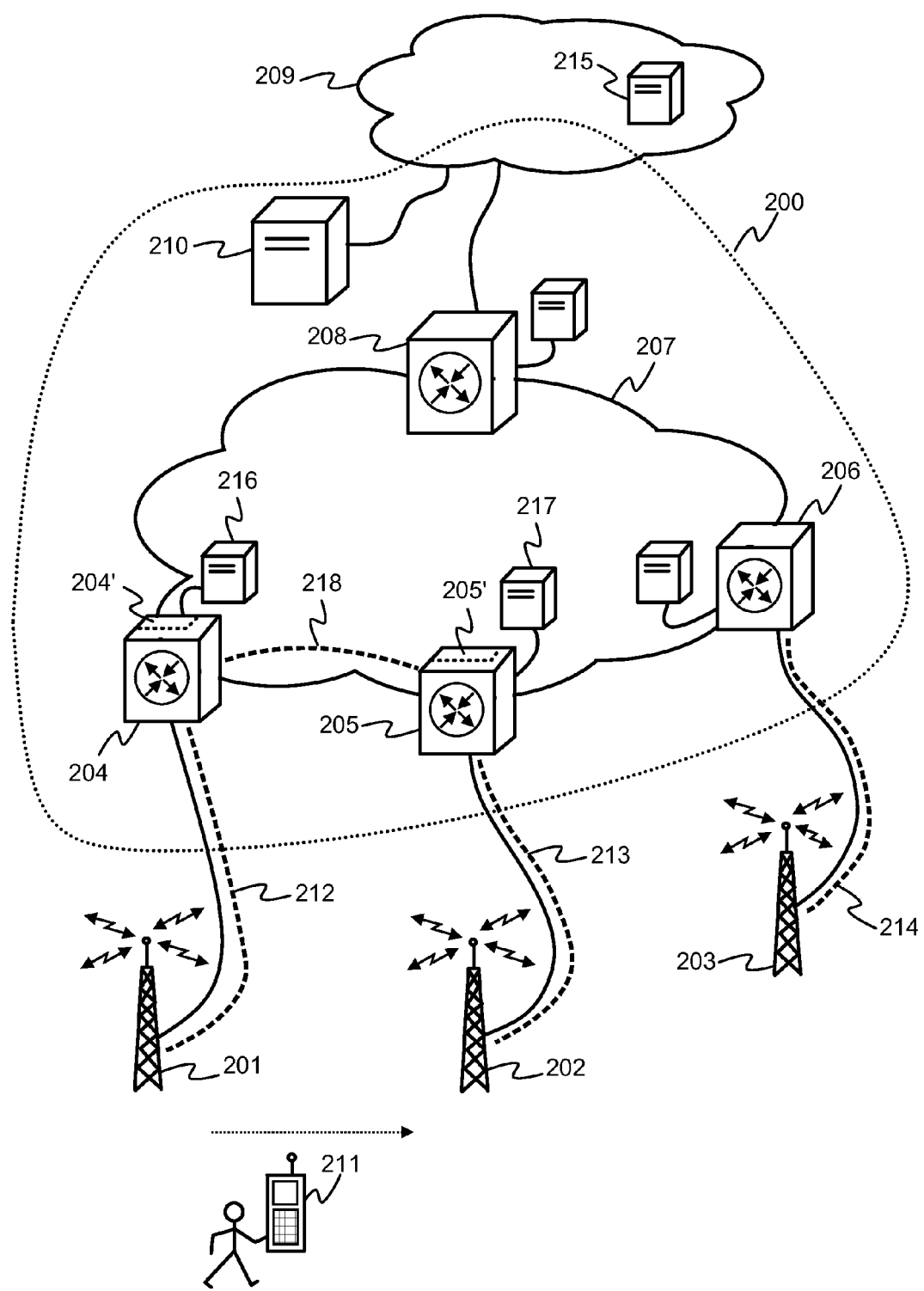
FIG. 2 shows a communication system including a system according to an embodiment of the invention for transferring a communication session from a data source to another data source.

FIG. 2 shows a communication system 200 used for connecting to base stations 201, 202, and 203 of a mobile telephone network and including a system according to an embodiment of the invention for transferring a communication session between data sources. The communication system includes data communication devices 204, 205, and 206 which may by e.g. Internet Protocol (IP) routers, Multiprotocol Label Switching (MPLS) devices and/or Ethernet switches. Each data communication device may consist of a single apparatus or a combination of a plurality of interconnected apparatuses. The data communication devices are interconnected through a regional communications network 207. The regional data communication network 207 may also include other data communication devices and communication links between them. The communication system is connected through data communication device 208 to a communications backbone network 209, which can be represented by the global Internet, for example. The communication system includes a mobility management entity (MME) 210 arranged to maintain up-to-date information about the location of a radio terminal 211 in the radio communication network comprised of base stations 201, 202, and 203. The mobility management entity 211 is connected to the data communication device 208 either directly or through other network elements. It is also possible that the mobility management entity 210 is embedded in the data communication device 208. The radio terminal 211 can be a mobile phone or palmtop computer, for example.

The mobility management entity 210 is arranged to produce, based on the location of the radio terminal 211, control data on the basis of which data communication device 204 is able to establish a logical data transmission tunnel 212 between the data communication device 204 and base station 201 in response to a situation in which the radio terminal is under the base station 201. Similarly, data communication device 205 is able to establish a logical data transmission tunnel 213 between the data communication device 205 and base station 202 in response to a situation in which the radio terminal is under the base station 202, and data communication device 206 is able to establish a logical data transmission tunnel 214 between the data communication device 206 and base station 203 in response to a situation in which the radio terminal is under the base station 203. The producing of said control data is often referred to as a communications network mobility function. Said logical data transmission tunnels may be e.g. GTP-U (General Packet Radio Service Tunneling Protocol—User plane messages) tunnels, GRE (Generic Routing Encapsulation) tunnels, IPinIP (Internet Protocol in Internet Protocol) tunnels or data transmission tunnels implemented using Ethernet frames. The logical data transmission tunnels advantageously comprise both a downstream tunnel from the data communication device to the base station and an upstream tunnel from the base station to the data communication device. The GRE tunnel is described e.g. in the technical specification IETF RFC2784 (Internet Engineering Task Force—Request For Comments), the IPinIP tunnel is described e.g. in the technical specification IETF RFC2003, and the GTP-U tunnel is described e.g. in the technical specification 3GPP TS29.060 (3rd Generation Partnership Project, Technical Specification).

In the situation depicted in FIG. 2 we may assume, for instance, that the radio terminal 211 is first under base station 201 and there exists an ongoing communication session between the radio terminal and a communications network, which session can comprise e.g. the downloading of a web page from a data source in the communications network to the radio terminal in accordance with the Transmission Control Protocol (TCP), for example. Said communication session may be originally established between the radio terminal 211 and a data source 215 behind the communication system 200. The data source 215 can be a server for maintaining certain web pages, for example. In said communication session, the payload data transmitted to the radio terminal, such as a certain web page, may also be stored in a first data source 216 and second data source 217 connected with the data communication devices 204 and 205, each of which may include a cache memory device, for example. In such a situation, the payload data is trans-mitted to the radio terminal 211 advantageously from data source 216 instead of data source 215 to produce a load as small as possible upon the communications network. It is of course possible that data source 216 is a server and said communication session was originally established between the radio terminal 211 and the data source 216. In a situation in which the radio terminal 211 is handed over from base station 201 to base station 202 the logical data transmission tunnel 212 is removed and a logical data transmission tunnel 213 is established based on the control data produced by the mobility management entity 210.

A system according to an embodiment of the invention for transferring a communication session from data source 216 to data source 217 has a first device 204' which has a communication interface for connecting to data source 216 either directly or through other means and which is arranged to maintain a communication session between a radio terminal 211 and data source 216 via a base station 201 in response to a situation in which the radio terminal is under the base station 201. In the situation depicted in FIG. 2 said first device 204' is part of the data communication device 204 but said first device can also be a separate device connected to the data communication device 204 and data source 216, for instance. The system for transferring a communication session further includes a second device 205' having a communication interface for connecting to data source 217 either directly or through other means. In the situation depicted in FIG. 2 said second device 205' is part of the data communication device 205 but said second device can also be a separate device connected to the data communication device 205 and data source 217. Said first device 204' is also arranged to carry out the following operations in response to a situation in which said radio terminal 211 has been handed over during said communication session from base station 201 to base station 202:

sending of session data related to said communication session to said second device 205', where said session data are arranged to indicate the session settings used in said communication session and the status of the communication session when said radio terminal is handed over from said first base station to said second base station, and sending of a first portion of payload data related to said communication session and stored in the first data source 216 to said second device 205'.

In the situation depicted in FIG. 2, the data communication devices 204 and 205 are arranged to establish a logical data transmission tunnel 218, and said first device 205' is arranged to tunnel the first portion of the payload data to said second device 204' and to include said session data in the tunneling control data. The logical data transmission tunnel 218 may be e.g. a GTP-U (General Packet Radio Service Tunneling Protocol—User plane messages) tunnel, GRE (Generic Routing Encapsulation) tunnel, IPinIP (Internet Protocol in Internet Protocol) tunnel or a data transmission tunnel implemented using Ethernet frames. It should be noted that tunneling, however, is not compulsory but the first portion of the payload data and the session data can also be sent in transmission frames routed seperately, for example.

Said second device 205' is arranged to carry out the following operations in response to the above-mentioned situation in which the radio terminal 211 has been handed over during said communication session from base station 201 to base station 202:

forwarding of the first portion of the payload data in accordance with said session settings to the radio terminal 211 via base station 202, and sending of a second portion of said payload data, which according to said session data still has to be sent to said radio terminal 211 during the communication session, from the data source 217 in accordance with said session settings via base station 202 to the radio terminal 211 in response to a situation in which the data source 217 contains the second portion of the payload data.

In a system according to an embodiment of the invention said first device 204' is arranged to send to said second device 205' the session data repeatedly so that the session data of a given moment indicate the session settings used at that moment in said communication session and the status of the communication session at that particular moment. Said second device 205' will thus have more than one opportunity to receive the data on the basis of which said second device 205' will become updated about the status of the communication session.

In a system according to an embodiment of the invention said session data comprise the session data of a transport layer session, arranged to indicate the session settings used in the transport layer session and the status of the transport layer session when the radio terminal 211 is handed over from base station 201 to base station 202. Said session data further comprise the session data of an application layer session, arranged to indicate the session settings used in the application layer session and the status of the application layer session when the radio terminal 211 is handed over from base station 201 to base station 202. The transport layer may be implemented using the Transmission Control Protocol (TCP), for example. Said session data may include e.g. the Internet Protocol (IP) addresses of the TCP session, port numbers of the TCP session, window parameters of the TCP session, TCP pointer to the starting point of the next-to-send payload data portion, and a TCP pointer to the end point of the payload data portion acknowledged as received. The second device 205' is arranged to establish, based on the session data, a similar TCP socket as the one used in said first device 204'.

In a system according to an embodiment of the invention said first device 204' and second device 205' are arranged to receive information from the communications network mobility function about the fact that the radio terminal 211 has been handed over from base station 201 to base station 202.

The transfer of the communication session is not visible to the radio terminal 211 because the transmission of payload data continues uninterrupted and the session settings, represented by TCP socket parameters, for example, remain unchanged during the transfer of the communication session. No client agent is therefore needed in the radio terminal 211 to control the communication session as the radio terminal is handed over from base station 201 to base station 202. The transmission of payload data continues uninterrupted because the first portion of said payload data is transmitted from the first device 204' to the second device 205' which is arranged to forward the first portion of the payload data to the radio terminal 211. The second device 205' is thus able to start the transmission of payload data without delay and from the correct position. While the second device 205' is forwarding payload data received from the first device 204', the second device 205' advantageously carries out the necessary initialization procedures to start transmitting the remaining second portion of the payload data from the second data source 217. If data source 217 does not include the second portion of the payload, said second portion will be transmitted from data source 216 to the radio terminal 211 via the data communication device 205 and base station 202 like said first portion of the payload data. In that case the communication session will not be transferred from data source 216 to data source 217 because data source 217 does not include the required payload data such as a given web page, for example.

In a system according to an embodiment of the invention said second device 205' is arranged to forward to the radio terminal 211, via base station 202, those parts of the first portion of the payload data which have been received from said first device 204' and which, according to session management messages from the radio terminal 211, should be retransmitted. Said session management messages can be e.g. TCP acknowledge messages. Said second device 205' is advantageously arranged to send to the first device 204' a command to stop transmitting payload data related to the communication session in response to a situation in which data source 217 contains the second portion of the payload data and, based on session management messages from the radio terminal 211, the radio terminal 211 has successfully received the first portion of the payload data. Said first device 204' is advantageously arranged to interrupt the transmission of said payload data to the second device 205' in response to the command to stop transmitting payload data related to the communication session. The logical data transmission tunnel 218 can then be removed. Said command to stop transmitting payload data related to the communication session can be e.g. a TCP socket disconnection message.

In a system according to another embodiment of the invention said second device 205' is arranged to transmit from data source 217 to the radio terminal 211 via base station 202 those parts of the first portion of the payload data which according to session management messages from the radio terminal 211 should be retransmitted, in response to a situation in which data source 217 contains the parts of the first portion of the payload data to be retransmitted. Said second device 205' is advantageously arranged to send to the first device 204' a command to stop transmitting payload data related to the communication session in response to a situation in which data source 217 contains the second portion of the payload data and also the parts of the first portion of the payload data to be retransmitted. Said first device 204' is advantageously arranged to interrupt the transmission of said payload data to the second device 205' in response to the command to stop transmitting payload data related to the communication session.

Figure 3:
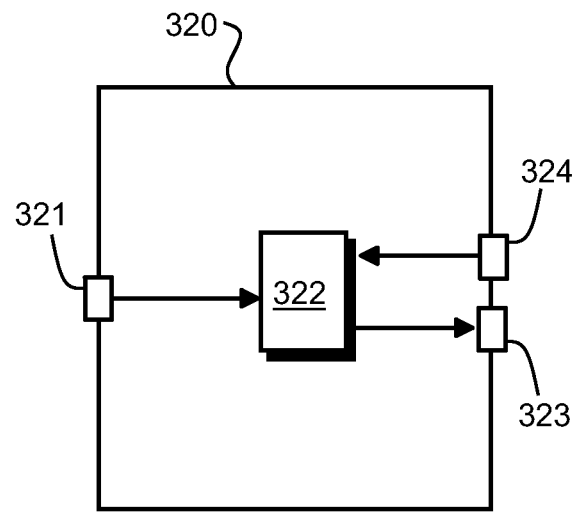
FIG. 3 shows a device according to an embodiment of the invention connectable to a data source handing over a communication session.

FIG. 3 shows a device 320 according to an embodiment of the invention connectable to a data source handing over a communication session. The device 320 may be used as device 204' in the system depicted in FIG. 2, for instance. The device has a communication interface 321 for connecting to a data source and a processor system 322 arranged to maintain a communication session between a radio terminal and said data source via a first base station in a communications network in response to a situation in which said radio terminal is under said first base station. The processor system 322 is also arranged to carry out the following operations in response to a situation in which said radio terminal is being handed over during said communication session from said first base station to a second base station in the communications network:

sending of session data related to said communication session to another device arranged to provide a data transfer connection with said second base station, where said session data are arranged to indicate the session settings used in said communication session and the status of the communication session when said radio terminal is being handed over from said first base station to said second base station, and sending of payload data related to said communication session and stored in said data source to said other device.

The device 320 depicted in FIG. 3 has communication interfaces 323 and 324 through which the device 320 can be connected to a data communication device for transmitting and receiving data through a communications network. The device 320 may also be integrated in a data communication device in which case the communication interfaces 323 and 324 are internal communication interfaces in the data communication device. For example, in the system depicted in FIG. 2 the first device 204' is part of the data communication device 204. It is also possible that the device 320 is integrated in a data source such as a server or cache memory device in which case the communication interface 321 is an internal communication interface in the data source.

In a device according to an embodiment of the invention the processor system 322 is arranged to interrupt the transmission of said payload data to the other device in response to a command received from the other device to stop transmitting payload data related to the communication session.

In a device according to an embodiment of the invention the processor system 322 is arranged to tunnel said payload data via the communications network to the other device and to include said session data in the tunneling control data. The tunneling may be implemented using e.g. a Generic Routing Encapsulation (GRE) tunnel, Ethernet frames, or an IPinIP (Internet Protocol in Internet Protocol) tunnel.

In a device according to an embodiment of the invention the processor system 322 is arranged to include in said session data the transport layer session data and application layer session data. The transport layer session data indicate the session settings used in the transport layer session and the status of the transport layer session when the radio terminal is being handed over from the first base station to the second base station. The application layer session data indicate the session settings used in the application layer session and the status of the application layer session when the radio terminal is being handed over from the first base station to the second base station. The transport layer may be implemented using e.g. the Transmission Control Protocol (TCP) in which case the session data may include e.g. the Internet Protocol (IP) addresses of the TCP session, port numbers of the TCP session, window parameters of the TCP session, TCP pointer to the starting point of the next-to-send payload data portion, and a TCP pointer to the end point of the payload data portion acknowledged as received.

In a device according to an embodiment of the invention the processor system 322 is arranged to receive information from the communications network mobility function about the fact that the radio terminal has been handed over from the first base station to the second base station.

In a device according to an embodiment of the invention the processor system 322 is arranged to send to said other device the session data repeatedly so that the session data of a given moment of time indicate the session settings used at that moment in said communication session and the status of the communication session at that particular moment.

Figure 4:
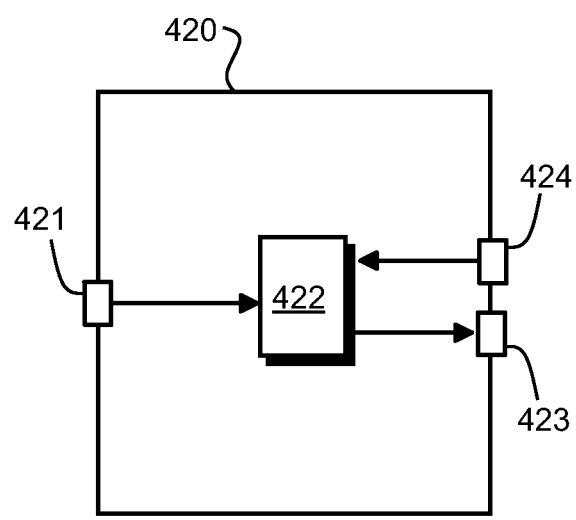
FIG. 4 shows a device according to an embodiment of the invention connectable to a data source receiving a communication session.

FIG. 4 shows a device 420 according to an embodiment of the invention connectable to a data source receiving a communication session. The device 420 may be used as device 205' in the system depicted in FIG. 2, for instance. The device 420 has a communication interface 421 for connecting to a data source and a processor system 422 arranged to carry out the following operations in response to a situation in which a radio terminal participating in said communication session is handed over from said first base station to a second base station in the communications network:
  receiving of session data related to said communication session from another device arranged to provide a data transfer connection with said first base station, where said session data are arranged to indicate the session settings used in said communication session and the status of the communication session when said radio terminal is handed over to said second base station from said first base station,
  forwarding of a first portion of payload data related to said communication session, received from said other device, to said radio terminal via said second base station in accordance with said session settings, and
  sending of a second portion of said payload data, which according to said session data still has to be sent to said radio terminal during the communication session, from said data source in accordance with said session settings via said second base station to said radio terminal in response to a situation in which said data source contains said second portion of the payload data.

The device 420 depicted in FIG. 4 has communication interfaces 423 and 424 through which the device 420 can be connected to a data communication device for transmitting and receiving data through a communications network. The device 420 may also be integrated in a data communication device in which case the communication interfaces 423 and 424 are internal communication interfaces in the data communication device. For example, in the system depicted in FIG. 2 the first device 205' is part of the data communication device 205. It is also possible that the device 420 is integrated in a data source such as a server or cache memory device in which case the communication interface 421 is an internal communication interface in the data source.

In a device according to an embodiment of the invention the processor system 422 is arranged to forward to the radio terminal, via the second base station, those parts of the first portion of the payload data which have been received from said other device and which according to session management messages from the radio terminal should be retransmitted. The processor system 422 is advantageously arranged to send to the other device a command to stop transmitting payload data related to the communication session in response to a situation in which the data source contains the second portion of the payload data and, based on session management messages from the radio terminal, the radio terminal has successfully received the first portion of the payload data.

In a device according to another embodiment of the invention the processor system 422 is arranged to send from the data source to the radio terminal, via the second base station, those parts of the first portion of the payload data which according to session management messages from the radio terminal should be retransmitted, in response to a situation in which the data source contains the parts of the first portion of the payload data to be retransmitted. The processor system 422 is advantageously arranged to send to the other device a command to stop transmitting payload data related to the communication session in response to a situation in which the data source contains the second portion of the payload data and the parts of the first portion of the payload data which are to be retransmitted.

In a device according to an embodiment of the invention the processor system 422 is arranged to read the session data from the tunneling control data of the payload data. The processor system 422 may be arranged to support one or more of the following, for example: Generic Routing Encapsulation (GRE) tunneling, tunneling with Ethernet frames, IPinIP (Internet Protocol in Internet Protocol) tunneling.

In a device according to an embodiment of the invention the processor system 422 is arranged to read from said session data the transport layer session data and application layer session data. The transport layer may be implemented using e.g. the Transmission Control Protocol (TCP) in which case the processor system 422 is arranged to establish, based on the session data, a TCP socket to implement said session settings.

In a device according to an embodiment of the invention the processor system 422 is arranged to receive information from the communications network mobility function about the fact that the radio terminal has been handed over to the second base station from the first base station.

In a device according to an embodiment of the invention the processor system 422 is arranged to receive the session data repeatedly from the other device, where the session data received at a given moment of time are arranged to indicate the session settings used at that moment in said communication session and the status of the communication session at that particular moment.

Figure 5:
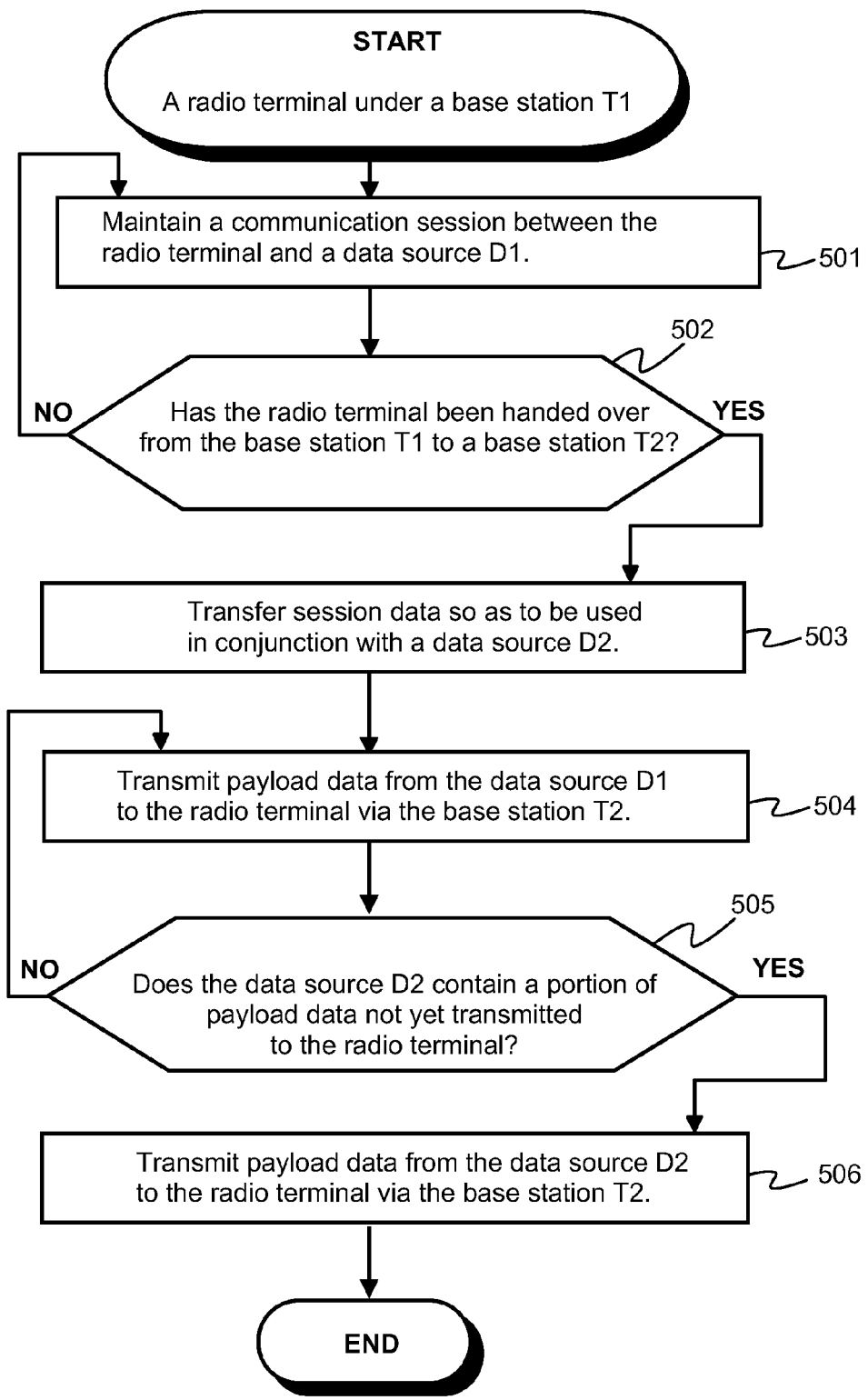
FIG. 5 shows as a flow chart a method according to an embodiment of the invention for transferring a communication session from a data source to another data source.

FIG. 5 shows as a flow chart a method according to an embodiment of the invention for transferring a communication session from a first data source D1 to a second data source D2. At step 501 a communication session between a radio terminal and the first data source D1 is maintained via a first base station T1 in a communications network in response to a situation in which said radio terminal is under said first base station T1. In response to the YES branch of decision-making step 502 where the radio terminal has been handed over during the communication session from the first base station T1 to the second base station T2 in the communications network, session data related to the communication session are transferred at step 503 to be used in conjunction with the second data source D2 so that the session data will be available when transmitting data to the radio terminal from the second data source D2. Said session data indicate the session settings used in the communication session and the status of the communication session when the radio terminal is handed over from the first base station T1 to the second base station T2. At step 504 a first portion of payload data related to said communication session is sent from said first data source D1 in accordance with said session settings to said radio terminal via said second base station T2. In response to a situation according to the YES branch of the decision-making step 505 where said second data source D2 contains the second portion of the payload data, which according to said session data still has to be sent to the radio terminal during the communication session, the second portion of the payload data mentioned at step 506 is sent in accordance with said session settings from said second data source D2 via said second base station T2 to the radio terminal. If said second data source D2 does not contain the payload data required, resulting in the situation according to the NO branch of the decision-making step 505, the sending of payload data is continued from data source D1 at step 504.

In a method according to an embodiment of the invention, those parts of the first portion of the payload data which according to session management messages from the radio terminal should be retransmitted, are retransmitted from the first data source D1 to the radio terminal via the second base station T2. The sending of the payload data from the first data source D1 is advantageously stopped in response to a situation in which the second data source D2 contains the second portion of the payload data and, based on session management messages from the radio terminal, the radio terminal has successfully received the first portion of the payload data.

In a method according to another embodiment of the invention, those parts of the first portion of the payload data which according to session management messages from the radio terminal should be retransmitted, are sent from the second data source D2 to the radio terminal via the second base station T2 in response to a situation in which the second data source D2 contains the parts of the first portion of the payload data to be retransmitted. The sending of the payload data from the first data source D1 is advantageously stopped in response to a situation in which the second data source D2 contains the second portion of the payload data and the parts of the first portion of the payload data to be retransmitted.

In a method according to an embodiment of the invention, said session data are transmitted in the tunneling control data of the payload data. The tunneling may be e.g. Generic Routing Encapsulation (GRE) tunneling, tunneling with Ethernet frames, or IPinIP (Internet Protocol in Internet Protocol) tunneling.

In a method according to an embodiment of the invention the session data comprises the session data for the transport layer session and session data for the application layer session. The transport layer session data are arranged to indicate the session settings used in the transport layer session and the status of the transport layer session when the radio terminal is being handed over to the second base station T2 from the first base station T1. The application layer session data are arranged indicate the session settings used in the application layer session and the status of the application layer session when the radio terminal is being handed over to the second base station T2 from the first base station T1. The transport layer may be implemented using the TCP, for example. Then, for the second data source, there is established, based on the session data, a similar TCP socket as the one used for the first data source. The transfer of the communication session is not visible to other radio terminals because no change occurs in the TCP socket in connection with the switchover from data source D1 to data source D2.

A method according to an embodiment of the invention utilizes at the decision-making step 501 information received from the communications network mobility function about whether the radio terminal has been handed over to the second base station T2 from the first base station T1.

In a method according to an embodiment of the invention said session data are sent repeatedly to the second data source D2 so that the session data of a given moment indicate the session settings used at that moment in said communication session as well as the status of the communication session at that particular moment.

A computer program according to an embodiment of the invention for a device connected with a data source handing over a communication session comprises software means for controlling the transfer of the communication session. The software means comprises instructions executable by a programmable processor device for making the programmable processor device carry out the following operations in response to a situation in which a radio terminal participating in said communication session is handed over during said communication session from a first base station in a communications network to a second base station in said communications network:

sending of session data related to said communication session to another device arranged to provide a data transfer connection with said second base station, where said session data are arranged to indicate the session settings used in said communication session and the status of the communication session when said radio terminal is being handed over from said first base station to said second base station, and sending of payload data related to said communication session and stored in said data source to said other device.

A computer program according to an embodiment of the invention for a device connected with a data source receiving a communication session comprises software means for controlling the transfer of the communication session. The software means comprises instructions executable by a programmable processor device for making the programmable processor device carry out the following operations in response to a situation in which a radio terminal participating in said communication session has been handed over during said communication session from a first base station in a communications network to a second base station in said communications network:

receiving of session data related to said communication session from another device arranged to provide a data transfer connection with said first base station, where said session data are arranged to indicate the session settings used in said communication session and the status of the communication session when said radio terminal is being handed over to said second base station from said first base station, forwarding of a first portion of payload data related to said communication session, received from said other device, to said radio terminal via said second base station in accordance with said session settings, and sending of a second portion of said payload data, which according to said session data still has to be sent to said radio terminal during the communication session, from said data source in accordance with said session settings via said second base station to said radio terminal in response to a situation in which said data source contains said second portion of the payload data.

A computer program according to an embodiment of the invention is stored on a storage medium, such as an optical compact disk (CD) readable by a programmable processor.

A computer program according to an embodiment of the invention is coded into a signal which can be received through a communications network such as the Internet, for example.

As is obvious to a person skilled in the art, the invention and its embodiments are not limited to the illustrative embodiments described above. Expressions used in the claims describing the existence of characteristic features, such as e.g. "the device has a communication interface", are non-exclusive such that a mention of a characteristic feature shall not exclude or necessitate the existence of other characteristic features not mentioned in the independent claims.

What is claimed is:

1. A device for controlling a transfer of a communication session, the device comprising:
    a communication interface for connecting to a data source, and
    a processor system arranged to
    (a) maintain a communication session between a radio terminal and said data source via a first base station in a communications network in response to a situation in which said radio terminal is under said first base station,
    (b) send, in response to a situation in which said radio terminal is being handed over during said communication session from said first base station to a second base station in the communications network, session data related to said communication session to another device arranged to provide a data transfer connection with said second base station, said session data being arranged to indicate session settings used in said communication session and status of the communication session when said radio terminal is being handed over from said first base station to said second base station, and
    (c) send, in response to the situation in which said radio terminal is being handed over during said communication session from said first base station to said second base station, payload data related to said communication session and stored in said data source to said other device.

2. A device according to claim 1, wherein the processor system is arranged to interrupt the transmission of said payload data to the other device in response to a command received from the other device to stop transmitting payload data related to the communication session.

3. A device according to claim 1, wherein the processor system is arranged to tunnel said payload data through the communications network to the other device and to include said session data in the tunneling control data.

4. A device according to claim 3, wherein the processor system is arranged to implement the tunneling with a Generic Routing Encapsulation (GRE) tunnel.

5. A device according to claim 3, wherein the processor system is arranged to implement the tunneling with Ethernet frames.

6. A device according to claim 3, wherein the processor system is arranged to implement the tunneling with an Internet Protocol in Internet Protocol (IPinIP) tunnel.

7. A device according to claim 1, wherein the session data comprises session data for a transport layer session, arranged to indicate the session settings used in the transport layer session and the status of the transport layer session when the radio terminal is being handed over from the first base station to the second base station, as well as session data for an application layer session, arranged to indicate the session settings used in the application layer session and the status of the application layer session when the radio terminal is being handed over from the first base station to the second base station.

8. A device according to claim 7, wherein the transport layer is implemented using the Transmission Control Protocol (TCP) and the session data include the Internet Protocol (IP) addresses of the TCP session, port numbers of the TCP session, and window parameters of the TCP session.

9. A device according to claim 1, wherein the processor system is arranged to receive information from the communications network mobility function about the fact that the radio terminal has been handed over from the first base station to the second base station.

10. A device according to claim 1, wherein the processor system is arranged to repeatedly send the session data to the other device, the session data sent at a given moment of time being arranged to indicate the session settings used at that moment in said communication session and the status of the communication session at that particular moment.

11. A device for controlling a transfer of a communication session, the device comprising:
    a communication interface for connecting to a data source, and
    a processor system arranged to
    (a) receive, in response to a situation in which a radio terminal participating in said communication session is handed over from a first base station in a communications network to a second base station in the communications network, session data related to said communication session from another device arranged to provide a data transfer connection with said first base station, said session data being arranged to indicate session settings used in said communication session and status of the communication session when said radio terminal is handed over to said second base station from said first base station,
    (b) forward, in response to the situation in which the radio terminal participating in said communication session is handed over from the first base station to the second base station, a first portion of payload data related to said communication session, received from said other device, to said radio terminal via said second base station in accordance with said session settings, and
    (c) send, in response to the situation in which the radio terminal participating in said communication session is handed over from the first base station to the second base station, a second portion of said payload data, which according to said session data still has to be sent to said radio terminal during the communication session, from said data source in accordance with said session settings via said second base station to said radio terminal in response to a situation in which said data source contains said second portion of the payload data.

12. A device according to claim 11, wherein the processor system is arranged to forward to the radio terminal, via the second base station, those parts of the first portion of the payload data which have been received from said other device and which according to session management messages from the radio terminal should be retransmitted.

13. A device according to claim 12, wherein the processor system is arranged to send to the other device a command to stop transmitting payload data related to the communication session in response to a situation in which the data source contains the second portion of the payload data and, based on session management messages from the radio terminal, the radio terminal has successfully received the first portion of the payload data.

14. A device according to claim 11, wherein the processor system is arranged to send from the data source to the radio terminal, via the second base station, those parts of the first portion of the payload data which according to session management messages from the radio terminal should be retransmitted, in response to a situation in which the data source contains said parts of the first portion of the payload data.

15. A device according to claim 14, wherein the processor system is arranged to send to the other device a command to stop transmitting payload data related to the communication session in response to a situation in which the data source contains the second portion of the payload data and those parts of the first portion of the payload data which according to session management messages from the radio terminal have to be retransmitted.

16. A device according to claim 11, wherein the processor system is arranged to read the session data from the tunneling control data of the payload data.

17. A device according to claim 16, wherein the processor system is arranged to support Generic Routing Encapsulation (GRE) tunneling.

18. A device according to claim 16, wherein the processor system is arranged to support tunneling implemented with Ethernet frames.

19. A device according to claim 16, wherein the processor system is arranged to support IPinIP (Internet Protocol in Internet Protocol) tunneling.

20. A device according to claim 11, wherein the session data comprise session data for a transport layer session, arranged to indicate the session settings used in the transport layer session and the status of the transport layer session when the radio terminal is handed over to the second base station from the first base station, as well as session data for an application layer session, arranged to indicate the session settings used in the application layer session and the status of the application layer session when the radio terminal is handed over to the second base station from the first base station.

21. A device according to claim 20, wherein the transport layer is implemented using the Transmission Control Protocol (TCP) and the processor system is arranged to establish, based on the session data, a TCP socket to implement said session settings, said session data comprising Internet Protocol (IP) addresses for the TCP session, port numbers of the TCP session, and window parameters of the TCP session.

22. A device according to claim 11, wherein the processor system is arranged to receive information from the communications network mobility function about the fact that the radio terminal has been handed over to the second base station from the first base station.

23. A device according to claim 11, wherein the processor system is arranged to repeatedly receive the session data from the other device, the session data received at a given moment of time being arranged to indicate the session settings used at that moment in said communication session and the status of the communication session at that particular moment.

24. A system for transferring a communication session from a first data source to a second data source, comprising:
 a first device having a communication interface for connecting to said first data source, which device is arranged to maintain a communication session between a radio terminal and said first data source via a first base station in a communications network in response to a situation in which said radio terminal is under said first base station, and
 a second device having a communication interface for connecting to said second data source,
 wherein the first device is also arranged to
 (a) send, in response to a situation in which said radio terminal has been handed over, during said communication session, from said first base station to a second base station in the communications network, session data related to said communication session to said second device, said session data being arranged to indicate session settings used in said communication session and status of the communication session when said radio terminal is handed over from said first base station to said second base station, and
 (b) send, in response to the situation in which said radio terminal has been handed over, during said communication session, from said first base station to the second base station, a first portion of payload data related to said communication session and stored in said first data source to said second device, and
 wherein said second device is arranged to
 (a) forward, in response to said situation in which said radio terminal has been handed over during said communication session from said first base station to said second base station, said first portion of payload data in accordance with said session settings to said radio terminal via said second base station, and
 (b) send, in response to the situation in which said radio terminal has been handed over, during said communication session, from said first base station to the second base station, a second portion of said payload data, which according to said session data still has to be sent to said radio terminal during the communication session, from said second data source in accordance with said session settings via said second base station to said radio terminal in response to a situation in which said second data source contains said second portion of the payload data.

25. A method for transferring a communication session from a first data source to a second data source, the method comprising:
 maintaining a communication session between a radio terminal and the first data source via a first base station in a communications network in response to a situation in which said radio terminal is under said first base station, and
 carrying out the following operations a, b and c as a response to a situation in which said radio terminal is handed over during said communication session from said first base station to a second base station in the communications network:
 (a) transferring session data related to said communication session to be usable in conjunction with the second data source, said session data indicating session settings used in said communication session and status of the communication session when said radio terminal is handed over from said first base station to said second base station,
 (b) sending a first portion of payload data related to said communication session from said first data source in accordance with said session settings to said radio terminal via said second base station, and
 (c) in response to a situation in which said second data source contains a second portion of the payload data, which according to said session data still has to be sent to said radio terminal during the communication session, sending the second portion of the payload data in accordance with said session settings from said second data source via said second base station to said radio terminal.

26. A non-transitory computer readable medium encoded with a computer program for a device connected to a data source for controlling a transfer of a communication session, the computer program comprising instructions executable by a programmable processor device for making the programmable processor device to carry out the following operations in response to a situation in which a radio terminal participating in said communication session is being handed over during said communication session from a first base station in a communications network to a second base station in said communications network:
- sending of session data related to said communication session to another device arranged to provide a data transfer connection with said second base station, where said session data are arranged to indicate session settings used in said communication session and status of the communication session when said radio terminal is handed over from said first base station to said second base station, and
- sending of payload data related to said communication session and stored in said data source to said other device.

27. A non-transitory computer readable medium encoded with a computer program for a device connected to a data source for controlling a transfer of a communication session, the computer program comprising instructions executable by a programmable processor device for making the programmable processor device carry out the following operations in response to a situation in which a radio terminal participating in said communication session has been handed over during said communication session from a first base station in a communications network to a second base station in said communications network:
- receiving of session data related to said communication session from another device arranged to provide a data transfer connection with said first base station, where said session data are arranged to indicate session settings used in said communication session and status of the communication session when said radio terminal is handed over to said second base station from said first base station,
- forwarding of a first portion of payload data related to said communication session, received from said other device, to said radio terminal via said second base station in accordance with said session settings, and
- sending of a second portion of said payload data, which according to said session data still has to be sent to said radio terminal during the communication session, from said data source in accordance with said session settings via said second base station to said radio terminal in response to a situation in which said data source contains said second portion of the payload data.

* * * * *